United States Patent
Skala et al.

[11] Patent Number: 6,132,689
[45] Date of Patent: Oct. 17, 2000

[54] MULTI-STAGE, ISOTHERMAL CO PREFERENTIAL OXIDATION REACTOR

[75] Inventors: Glenn William Skala, Churchville; Mark A. Brundage, Pittsford; Rodney Lynn Borup, East Rochester; William Henry Pettit, Rochester; Kevin Stukey, W. Henrietta; David James Hart-Predmore, Rochester; Joel Fairchok, Alexander, all of N.Y.

[73] Assignee: General Motors Corporation, Detroit, Mich.

[21] Appl. No.: 09/158,057

[22] Filed: Sep. 22, 1998

[51] Int. Cl.[7] .................. B01J 8/00; F28D 21/00
[52] U.S. Cl. ............... 422/193; 422/198; 422/194; 422/195; 422/205; 422/220; 422/211; 165/166
[58] Field of Search ................ 423/246, 247, 423/437.2; 429/20, 26; 422/215, 220, 222, 198, 200, 197, 196, 190–195, 171, 177, 180, 205, 228; 165/164–167

[56] References Cited

U.S. PATENT DOCUMENTS

| | | | |
|---|---|---|---|
| 5,271,916 | 12/1993 | Vanderborgh et al. | 423/246 |
| 5,316,747 | 5/1994 | Pow et al. | 423/247 |
| 5,456,889 | 10/1995 | Pow et al. | 422/173.1 |
| 5,518,705 | 5/1996 | Buswell et al. | 423/437 M |
| 5,874,051 | 2/1999 | Heil et al. | 422/171 |

FOREIGN PATENT DOCUMENTS

| | | |
|---|---|---|
| 0 776 861 | 6/1997 | European Pat. Off. . |
| 8-100184 | 4/1996 | Japan . |

OTHER PUBLICATIONS

Derwent Abstract for EP 776861.

*Primary Examiner*—Marian C. Knode
*Assistant Examiner*—Susan Ohorodnik
*Attorney, Agent, or Firm*—Lawrence B. Plant

[57] ABSTRACT

A multi-stage, isothermal, carbon monoxide preferential oxidation (PrOx) reactor comprising a plurality of serially arranged, catalyzed heat exchangers, each separated from the next by a mixing chamber for homogenizing the gases exiting one heat exchanger and entering the next. In a preferred embodiment, at least some of the air used in the PrOx reaction is injected directly into the mixing chamber between the catalyzed heat exchangers.

9 Claims, 6 Drawing Sheets

6,132,689

MULTI-STAGE, ISOTHERMAL CO PREFERENTIAL OXIDATION REACTOR

The Government of the United States of America has rights in this invention pursuant to Agreement No. DE-AC02-90CH10435 awarded by the U.S. Department of Energy.

TECHNICAL FIELD

The present invention relates to a multi-stage, isothermal reactor for the preferential oxidation of carbon monoxide in a hydrogen-rich fuel stream for a fuel cell.

BACKGROUND OF THE INVENTION $H_2$—$O_2$ fuel cells use hydrogen as a fuel and oxygen (as air) as an oxidant. The hydrogen used in the fuel cell can be derived from the reformation of methanol or other organics (e.g. hydrocarbons). For example, in the methanol reformation process, methanol and water (as steam) are ideally reacted in a catalytic reactor (a.k.a. "reformer") to generate a reformate gas comprising hydrogen and carbon dioxide according to the reaction:

$$CH_3OH + H_2O \rightarrow CO_2 + 3H_2$$

One such reformer is described in U.S. Pat. No. 4,650,727 to Vanderborgh. Unfortunately, the reformate exiting the reformer also contains undesirably high concentrations of carbon monoxide most of which must be removed to prevent poisoning of the catalyst of the fuel cell's anode. In this regard, carbon monoxide (i.e., about 1–3 mole %) contained in the $H_2$-rich reformate/effluent exiting the reformer must be reduced to very low nontoxic concentrations (i.e., less than about 20 ppm) to avoid poisoning of the anode.

It is known that the carbon monoxide, CO, level of the reformate/effluent exiting a methanol reformer can be reduced by utilizing a so-call "shift" reaction wherein water (i.e. steam) is added to the methanol reformate/effluent exiting the reformer, in the presence of a suitable catalyst. This lowers the carbon monoxide content of the reformate according to the following ideal shift reaction:

$$CO + H_2O \rightarrow CO_2 + H_2$$

Some (i.e., about 0.5 mole % or more) CO still survives the shift reaction, and any residual methanol in the reformate is converted to carbon dioxide and hydrogen in the shift reactor. Hence, shift reactor effluent comprises hydrogen, carbon dioxide, water and carbon monoxide.

The shift reaction is not enough to reduce the CO content of the reformate enough (i.e., to below about 20 ppm). Therefore, it is necessary to further remove carbon monoxide from the hydrogen-rich reformate stream exiting the shift reactor, and prior to supplying it to the fuel cell. It is known to further reduce the CO content of $H_2$-rich reformate exiting the shift reactor by a so-called "PrOx" (i.e., preferential oxidation) reaction effected in a suitable PrOx reactor operated at temperatures which promote the preferential oxidation of the CO by air in the presence of the $H_2$, but without consuming/oxidizing substantial quantities of the $H_2$ or triggering the so-called "reverse water gas shift" (RWGS) reaction. The PrOx and RWGS reactions are as follows:

$$CO + 1/2 O_2 \rightarrow CO_2 \text{ (PrOx)}$$

$$CO_2 + H_2 \rightarrow H_2O + CO \text{ (RWGS)}$$

The PrOx process is described in a paper entitled "Methanol Fuel Processing for Low Temperature Fuel Cells" published in the Program and Abstracts of the 1988 Fuel Cell Seminar, Oct. 23–26, 1988, Long Beach, Calif., and in Vanderborgh et al U.S. Pat. No. 5,271,916, inter alia.

Desirably, the $O_2$ required for the PrOx reaction will be about two times the stoichiometric amount required to react the CO in the reformate If the amount of $O_2$ exceeds about two times the stoichiometric amount needed, excessive consumption of $H_2$ results. On the other hand, if the amount of $O_2$ is substantially less than about two times the stoichiometric amount needed, insufficient CO oxidation will occur and there is greater potential for the RWGS reaction to occur. Accordingly in practice, many practitioners use about 4 or more times the stoichiometric amount of $O_2$ than is theoretically required to react with the CO.

PrOx reactors may be either (1) adiabatic (i.e. where the temperature of the reactor is allowed to rise during oxidation of the CO) or (2) isothermal (i.e. where the temperature the reactor is maintained substantially constant during oxidation of the CO). The adiabatic PrOx process is sometimes effected via a number of sequential stages, which progressively reduce the CO content in stages, and requires careful temperature control, because if the temperature rises too much, the RWGS reaction can occur which counter productively produces more CO. The isothermal process can effect the same CO reduction as the adiabatic process, but in fewer stages and without concern for the RWGS reaction if (1) the reactor temperature can be kept low enough, and (2) $O_2$ depletion near the end of the reactor can be avoided.

One known isothermal reactor is essentially a catalyzed heat exchanger having a thermally conductive barrier or wall that separates the heat exchanger into (1) a first channel through which the $H_2$-rich gas to be decontaminated (i.e. CO removed) passes, and (2) a second channel through which a coolant flows to maintain the temperature of the reactor substantially constant within a defined working range. The barrier wall has a catalyzed first surface confronting the first channel for promoting the CO+$O_2$ reaction, and an uncatalyzed second surface confronting the second channel for contacting the coolant therein to extract heat from the catalyzed first surface through the barrier. The catalyzed surfaces of adjacent barriers oppose each other, and are closely spaced from each other, so as to define a narrow first channel through which the $H_2$-rich gas moves under substantially laminar flow conditions. Unfortunately, under such flow conditions, only the outer layers of the gas stream moving through the first channel contact the catalyst for reacting the CO and $O_2$ therein. The central layers of the gas stream, midway between the opposed catalyzed surfaces, can actually pass through the first channel unreacted by the catalyst, and hence retain much of their CO and $O_2$ unreacted. Moreover, hot or cold spots, flow maldistribution, or nonuniformities within the reactor (e.g. non-uniform catalyst loadings), can cause different rates of reaction to occur at different sites within the heat exchanger, which in turn, can cause some of the CO and $O_2$ in the gas stream not to react. The net effect is that considerable CO and $O_2$ can pass unreacted through the reactor unless the reactor is made very large.

The present invention overcomes the aforesaid problem by providing an efficient, multi-stage reactor that periodically homogenizes the gas being treated en route through the reactor so as to substantially uniformly distribute the CO and $O_2$ in the gas between different reaction stages of the reactor. The outer layers of the gas stream contacting the catalyst downstream of homogenization are hence enriched with CO and $O_2$ for more effective reaction on the downstream catalyst. Moreover, by introducing some of the air into the gas stream at the homogenization site, it is possible to reduce the excess $O_2$ needed for the reaction as well as reduce the incidence of the RWGS reaction near the end of the reactor.

SUMMARY OF THE INVENTION

The present invention comprehends a multistage, isothermal, preferential oxidation (a.k.a. "PrOx") reactor for the selective reaction of CO with $O_2$ in a H2-rich gas that flows through the reactor in order to reduce the CO content of the gas to a suitable level which is not toxic (i.e. below about 20 ppm) to a fuel cell catalyst. The reactor comprises a plurality of catalyzed heat exchangers serially arranged within a housing in the direction the $H_2$-rich gas flows through the reactor. The several catalyzed heat exchangers promote the $CO+O_2$ reaction in a series of progressive steps in which the CO content of the gas is incrementally reduced from one catalyzed heat exchanger to the next as the gas flows through the catalyzed heat exchangers. The heat exchangers each comprise a plurality of thermally conductive barriers that separate the heat exchanger into (1) a plurality of first channels through which separate streams of the $H_2$-rich gas flow, and (2) a plurality of second channels through which a gaseous or liquid coolant flows to maintain the temperature of the heat exchanger substantially constant. Preferably, the channels are constructed and arranged such that the direction the coolant flows in the second channels is transverse the direction of $H_2$-rich gas flow in the first channels. Preferably, a single barrier separates a plurality of first channels from a single second channel, and most preferably, these first channels include a first channel from at least two different heat exchangers. The first channels have inlet and outlet ends for respectively admitting and exhausting the $H_2$-rich gas into and out of the first channels. The barriers separating the first and second channels each have (1) a catalyzed first surface confronting a first channel for promoting the $CO+O_2$ reaction therein, and (2) a second surface confronting a second channel for contacting the coolant in the second channel to extract heat from the catalyzed first surface, through the barrier, and maintain a substantially constant heat exchanger temperature that encourages the $CO+O_2$ reaction and discourages the formation of CO from the reaction of $CO_2$ with $H_2$ (i.e. the "reverse water gas shift reaction"). The reactor includes a mixing chamber between each of the heat exchangers. The mixing chamber communicates with the outlet ends of the first channels of the heat exchanger that is immediately upstream of the chamber and the inlet ends of the heat exchanger that is immediately down stream of the chamber. The mixing chambers will preferably be defined by the housing enclosing the heat exchangers, and serve to receive and substantially homogenize the $H_2$-rich gas streams exiting the upstream heat exchanger so as to distribute any unreacted $O_2$ and CO in those streams substantially uniformly throughout the gas before it enters the downstream catalyzed heat exchanger. So distributing the $O_2$ and CO intermediate the heat exchangers insures that more of the CO and $O_2$ will contact the catalyzed surface of the downstream heat exchanger(s) and be consumed in the reactor. In a preferred embodiment of the invention, each mixing chamber includes at least one air inlet for receiving at least a portion of the $O_2$ required for the $CO+O_2$ injection into the chamber for mixing with the streams exiting from the upstream heat exchanger before they enter the downstream heat exchanger. $O_2$ injection into the gas stream at various locations en route through the reactor promotes better consumption of the CO with less total $O_2$, and insures that there will always be some $O_2$ present in the $H_2$-rich gas stream at the outlet end of the last catalyzed heat exchanger in the series to suppress the reverse water gas shift reaction that could otherwise occur there in the absence of $O_2$.

According to a preferred embodiment of the invention, the first surface of one of the barriers and the first surface of the next adjacent barrier are spaced from each other by at least one divider and together with the divider define first channels for at least two heat adjacent exchangers. These first channels of the two adjacent heat exchangers are most preferably substantially coplanar with each other, and are arranged and constructed to cause the gas therein to flow in opposite directions to each other.

The heat exchangers may be aligned end-to-end along an axis of the housing such that the outlet end of the upstream heat exchanger directly opposes the inlet end of the heat exchanger downstream of the chamber. Alternatively, the heat exchangers may be aligned side-by-side along an axis of the housing such that the inlet end of one heat exchanger is substantially coplanar with the outlet end of the next adjacent heat exchanger, and the chamber adjoining the inlet and outlet ends is defined by the housing and is adapted to reverse the direction of flow of the gas exiting the outlet end and entering the inlet end. Inlet and exhaust manifolds at the first and last heat exchangers in the series respectively serve to supply $H_2$-rich gas to the first heat exchanger and collect the gas from the last heat exchanger.

DESCRIPTION OF THE PREFERRED EMBODIMENT

Figure 1:
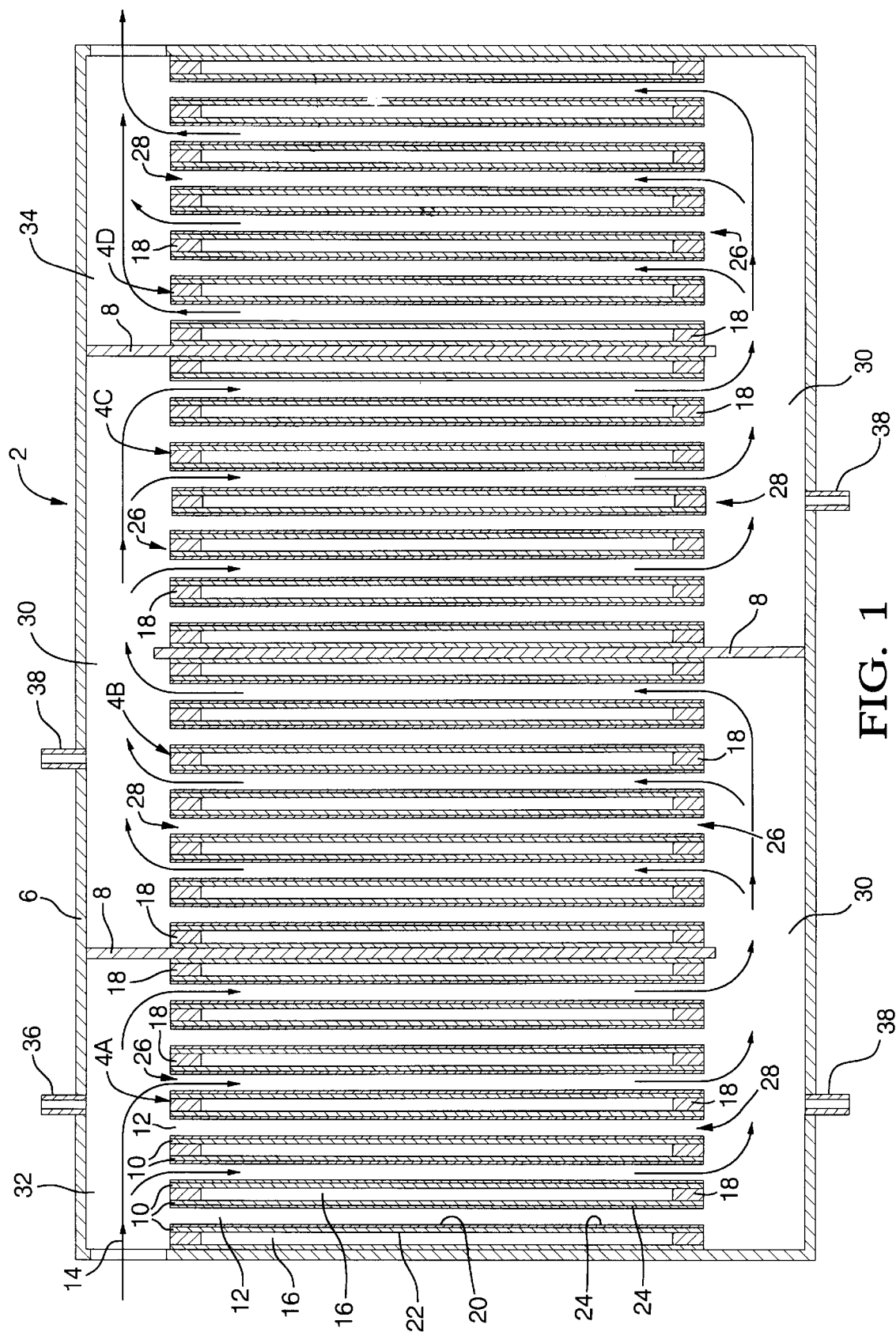
FIG. 1 illustrates, in side elevation, a multi-stage, isothermal PrOx reactor in accordance with this invention.

FIG. 1 illustrates a multi-staged isothermal reactor for the selective reaction of carbon monoxide (CO) with oxygen (i.e., from air) in an $H_2$-rich gas to form $CO_2$ in the gas. The reactor 2 comprises a plurality of discrete heat exchangers 4A–4D arranged side by side in a common housing 6 with each heat exchanger 4A–4D separated one from the other by partitions 8. Each heat exchanger 4A–4D comprises a plurality of thermally conductive barriers (e.g. plates) 10 which separate the heat exchanger 4 into a plurality of first channels 12 through which the $H_2$-rich gas 14 flows and second channels 16 through which a coolant (i.e. gas is or liquid) flows in a direction transverse (e.g. 90 degrees) the direction of flow of the hydrogen-rich 14 through the first channels 12. The second channels 16 are further defined by spacer bars 18 which serve to space the barrier plates 10 from each other as well as seal off the edges of the barriers 10 to contain the coolant within the second channels 16. The barriers 10 have a first surface 20 confronting a first channel 12 and a second surface 22 confronting the second channel 16 for engagement with the coolant flowing in the second channel 16. A layer of catalyst 24 suitable to promoting the $O_2+CO$ reaction is deposited atop the first surface 20 and is contacted by a portion of the stream of hydrogen-rich gas 14 passing through the first channel 12. In this regard, the hydrogen-rich gas 14 will generally flow through the first passages 12 under laminar flow conditions such that layers of the gas at the boundaries of the stream 14 will contact the catalyst layer 24 and cause the carbon monoxide and oxygen to form carbon dioxide. As the gas progresses from the inlet ends 26 of the heat exchangers 4A–4D to the outlet ends 28 thereof, oxygen and carbon monoxide from the center layers of the stream will diffuse into the outer layers adjacent the catalyst 24, and cause that oxygen and carbon monoxide to react on the catalyst 24. However, some of the carbon monoxide and oxygen within the central layers of the gas stream remote from the catalyst 24 passes through the first heat exchanger 4A unreacted. Moreover, differences in catalyst activity, catalyst loading, gas flow rate, and temperature throughout the catalyzed heat exchanger 4A can result in the amount of carbon monoxide oxidation occurring in each first channel 12 to be different. Hence the amount of carbon monoxide and oxygen exiting first channels 12 of the first catalyzed heat exchanger 4A will not likely be the same. The same is true for the other heat exchangers 4B–4D.

In accordance with the present invention the catalyzed heat exchanger 4 is divided into at least two discrete segments (four segments 4A–4D are shown in FIG. 1), and each separated from the next by a mixing chamber 30 to substantially homogenize the gases exiting the previous (i.e. upstream) heat exchanger before it enters the subsequent (i.e. downstream) heat exchanger. The mixing chamber 30 is a confluence of the gas streams exiting the several first channels 12 of the heat exchangers 4A–4C and promotes mixing and homogenization of the gases. In this regard, depending on the volume of the mixing chambers 30, the gases exiting the outlet ends 28 expand by two to seven or more times as they enter the mixing chambers 30 causing their velocity to correspondingly decrease two to seven or more times which, in turn, promotes better mixing/homogenization of the gases.

Operationally, CO-containing hydrogen-rich gas 14 enters an inlet manifold 32 and hence inlet ends 26 of the first channels 12 of heat exchangers 4A, and exits the first channels 12 at outlet ends 28. At the same time, a suitable coolant (i.e. liquid or gas) flows in the second channels 16 in a direction perpendicular to the flow of the gas 14 to maintain the temperature of the heat exchangers substantially constant at a temperature suitable for promoting the $O_2+CO$ reaction while discouraging the reverse $CO_2+H_2$ reaction. For example in the case of a catalyzed heat exchanger having an iridium catalyst, the operating temperature of the catalyzed heat exchanger will generally be about 180° C. to about 240° C. which is sufficient to drive the forward $CO+O_2$ PrOx reaction but insufficient to promote a significant amount of the reverse water gas shift reaction to occur. Other catalysts (e.g. Group 8 metals) effect the PrOx reaction at different temperatures ranging from about 80° C. to about 260° C. The gases exiting outlet ends 28 of heat exchanger 4A are mixed together in a mixing chamber 30 before entering the next adjacent heat exchanger 4B. This process is repeated for heat exchangers 4C and 4D. Periodically homogenizing the gas en route through the reactor 2 results in a more efficient consumption of the carbon monoxide and utilization of the oxygen. The hydrogen-rich gas eventually exits the reactor 2 via exhaust manifold 34 from whence it flows to the fuel cell.

In accordance with a preferred embodiment of the present invention a portion of the oxygen/air is inserted (e.g.

injected) into the reactor 2 at the beginning (i.e. in the intake manifold 32) and the balance at one or more of the mixing chambers 30. So inserting the oxygen/air at multi locations within the reactor allows for (1) better control of the reactor, and (2) a lower $O_2$ to CO ratio, and ensures that there will be at least some oxygen remaining for reaction near the outlet ends 28 of the channels 12 of the last heat exchanger 4D to reduce the possibility of the RWGS reaction occurring there. Otherwise, if all of the air/oxygen is depleted at the end point in the reactor, the catalyst 24 will promote the reverse water gas shift reaction thereby forming carbon monoxide defeating the purpose of the reactor. Injector 36 injects some of the air into the inlet manifold 32, while the remainder is injected into the several mixing chambers 30 via injectors 38. The injector 36 may comprise a high pressure gas injector, well known in the art, or simply a valved tube or the like for controlling the amount of air entering the reactor therethrough. The fresh oxygen/air mixes with the hydrogen-rich stream exiting the outlet ends 28 of each of the heat upstream exchangers before entering the downstream heat exchangers.

It has also been found that insertion of the oxygen/air at various stages along the gas flow route permits a reduction in the total amount of oxygen/air normally used. Hence for example, when all the air is inserted upfront, it was quite common for practioners to use about 4–5 times the stoichiometric amount of air required to react to the carbon monoxide in the hydrogen rich gas. Inserting the air into the mixing chambers 30 along the gas flow path permits the use of less excess oxygen/air i.e. only about 2 to about 3 times the stoichiometric amount of air required to consume the carbon monoxide.

Figure 2:
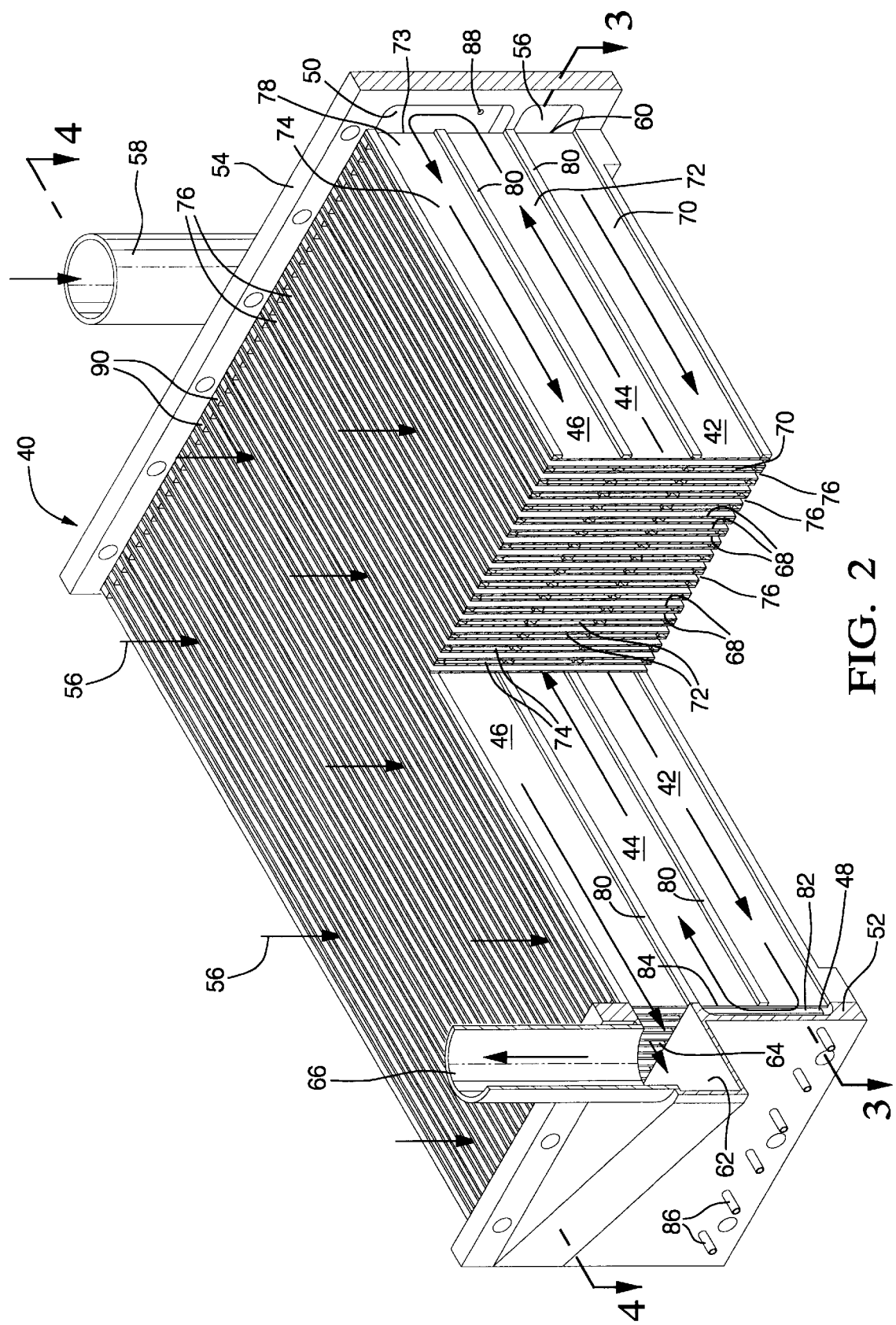
FIG. 2 is an isometric view of one specific embodiment of a multi-stage isothermal reactor in accordance with the present invention.
Figure 3:
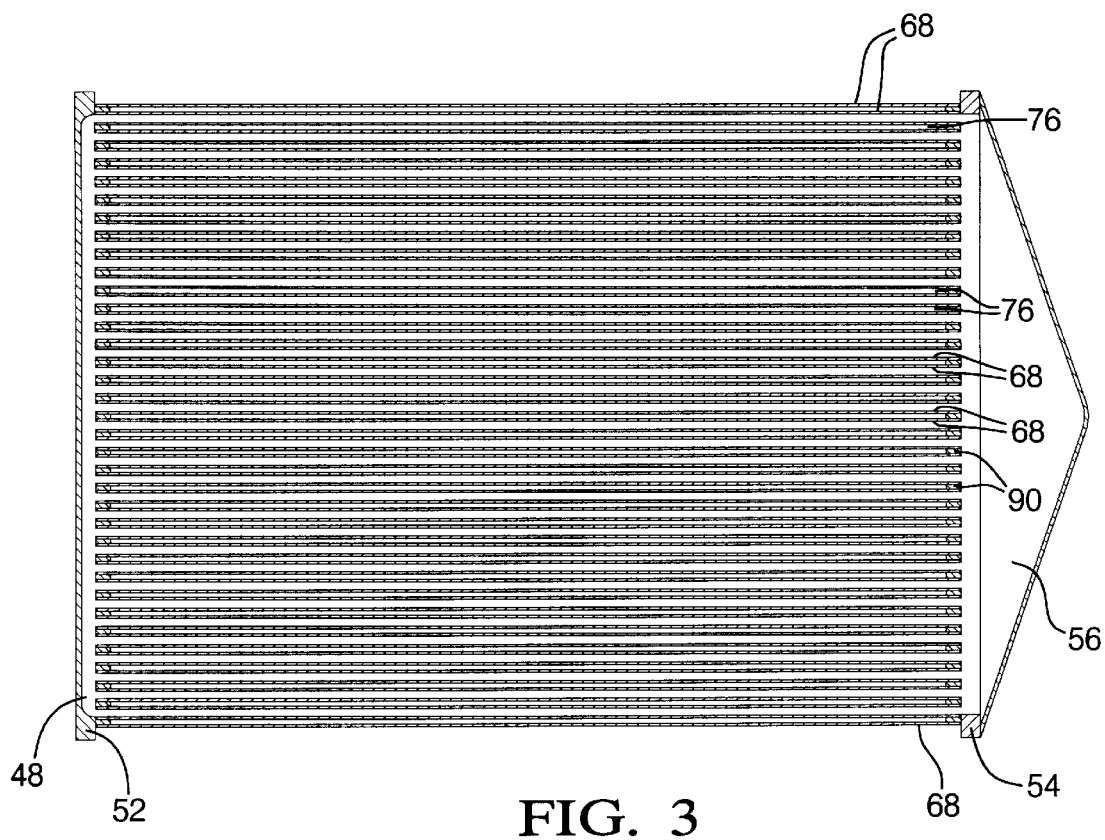
FIG. 3 is a view in the direction of 3—3 of FIG. 2.
Figure 4:
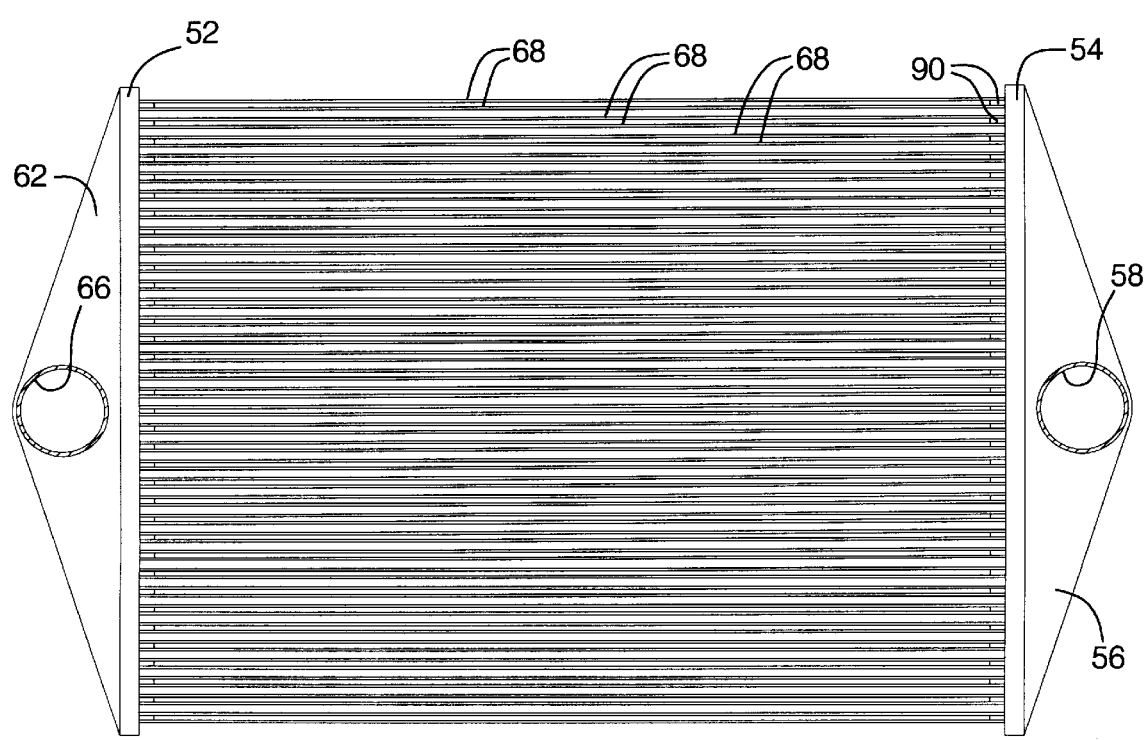
FIG. 4 is a plan view in the direction of 4—4 of FIG. 2.

FIGS. 2–4 show the structure of one alternative embodiment of a multi-stage isothermal reactor 40 in accordance with the present invention. In this embodiment, three catalyzed heat exchangers 42, 44 and 46 are shown serially arranged, in side-by-side relation, and communicating one with the next by intermediate mixing chambers 48 and 50 formed as cavities in end plates 52 and 54 respectively which form part of the reactors housing. The remainder of the housing (not shown) would include closure members on the top and bottom of the reactor 40 which would define respectively a coolant inlet manifold for admitting coolant 56 into the top of reactor 40, and a coolant exhaust manifold for removing coolant 56 from the bottom of reactor 40. The end plate 54 includes an inlet manifold 56 which receives hydrogen-rich gas from a conduit 58 and distributes it into the inlet end 60 of the first heat exchanger 42. Similarly, the end plate 52 includes an exhaust manifold 62 which receives the hydrogen-rich gas exiting the outlet end 64 of the third heat exchanger 46 and directing it to exhaust conduit 66 from whence it flows to a fuel cell. More specifically, the heat exchangers comprise a plurality of thermally conductive barrier plates 68 which separate the heat exchangers into first channels 70, 72 and 74 for heat exchangers 42, 44 and 46 respectively and through which the hydrogen-rich gas flows. Coolant 56 flows through second channels 76 transverse to the direction of flow in the first channels 70, 72 and 74. The face 78 of the barriers 68 is catalyzed and divided into three sections by dividers 80 so as to form the three first channels 70, 72 and 74 of separate heat exchangers 42, 44, and 46 respectively. The hydrogen-rich gas enters the input end 60 of the first channels 70 of the first heat exchanger 42, traverses the length of the channels 70 (right to left in the drawing) to the outlet end 82 of the first heat exchanger 42 and thence into the mixing chamber 48 for homogenization and transport to the input end 84 of the second heat exchanger 44. It then flows through the first channels 72 of heat exchanger 44 and into the second mixing chamber 50 for homogenization therein and conducting to the input end 73 of the last heat exchanger 46. The gas traverses the first channels 74 of the last heat exchanger 46 in the direction indicated by the arrow and dumps into the exhaust manifold 62 from whence it is conveyed to the fuel cell via conduit 66. In this embodiment, a single second channel 76 conveys coolant to all three heat exchangers 42, 44 and 46. The coolant preferably flows countercurrent to the general direction of the hydrogen-rich gas flow through the reactor 40. In this regard in the embodiment shown in FIG. 2, the coolant flows generally from the top of the reactor 40 to the bottom of the reactor 40 whereas the hydrogen-rich gas generally flows from the bottom of the reactor 40 to the top of the reactor 40 (albiet via a tortuous path through heat exchangers 42, 44 and 46). The first channels 70, 72, and 74 of first, second and third heat exchangers 42, 44, and 46 are coplanar in that each lies adjacent to each other in the same plane, and the hydrogen-rich gas flows therein in alternately opposite directions as indicated by the arrows on the drawing. In accordance with a preferred embodiment of the present invention, one or more oxygen/air injectors 86 inject air/oxygen into mixing chamber 48 while injectors 88 inject oxygen/air into mixing chamber 50 for intimate mixing of the air with the effluent from heat exchanger 42 before it enters heat exchanger 44. Spacer bars 90 space the barrier plates 68 from each other at the ends thereof to provide and define the second channel 76 through which the coolant flows.

Figure 5:
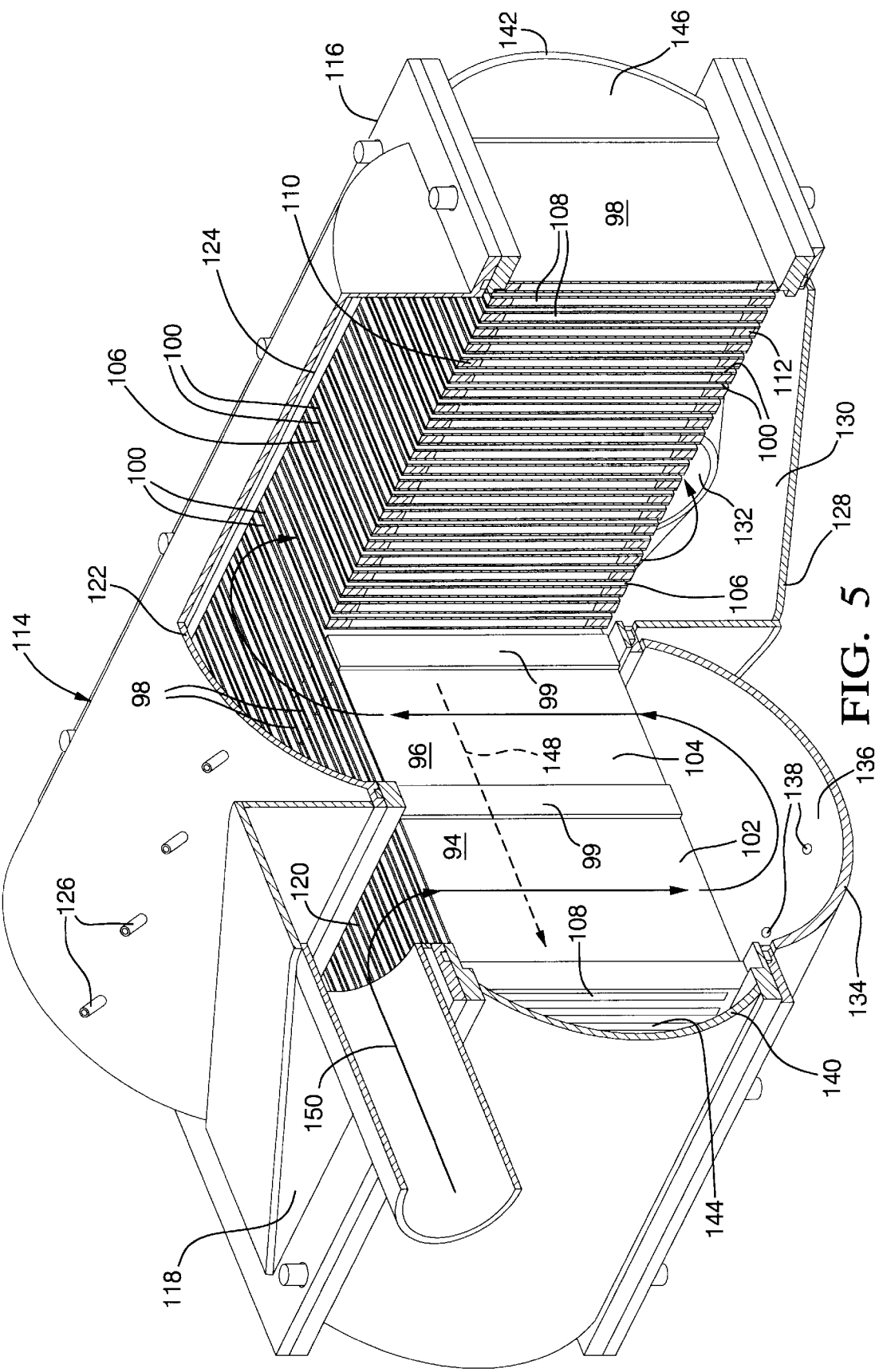
FIG. 5 is another embodiment of a multi-stage isothermal reactor in accordance with the present invention.

FIG. 5 shows still another embodiment of the present invention similar to that described in conjunction with FIGS. 2–4. In this regard, there is shown first, second and third heat exchangers 94, 96 and 98 arranged side-by-side and separated each from the other by dividers 99. Thermally conductive barrier plates 100 separate first hydrogen-rich gas flow channels 102, 104 and 106 of the first, second and third heat exchangers 94, 96 and 98 respectively from coolant flow channels 108 that are defined by adjacent thermal conductive barriers 100 and spacer bars 110 and 112 interjacent the ends of the barrier plates 100. The several heat exchangers 94, 96 and 98 are enclosed by a housing 114 shaped to conduct the hydrogen-rich gas and coolant through the several heat exchangers. More specifically, a cover member 116 includes an inlet manifold 118 that distributes the hydrogen-rich gas to input end 120 of the first heat exchanger 94. The cover member 116 also includes a truncated cylindrical portion 122, which forms a mixing chamber 124 between the second and third heat exchangers 96 and 98 respectively. A plurality of oxygen/air injectors 126 are provided along the length of the truncated cylindrical portion 122 for injecting oxygen/air into the hydrogen-rich effluent from the second heat exchanger 96 for mixing therewith before the mixture enters the third heat exchanger 98. The housing 114 also includes a bottom closure member 128 which includes an exhaust manifold 130 for collecting hydrogen-rich gases exiting the last heat exchanger 98 and directing them into conduit 132 for supplying the anode of a fuel cell. The bottom closure member 128 also includes a truncated cylindrical portion 134 which defines a mixing chamber 136 for homogenizing the gases leaving the first heat exchanger 94 and entering the second heat exchanger 96. One or more oxygen/air injectors 138 are provided to the truncated cylindrical portion 134 for admitting oxygen/air into the mixing chamber 136 for intimate mixing with the effluent from the first heat exchanger 94. The housing 114 also includes arcuate end plates 140 and 142 which respectively define a coolant exhaust manifold 144 and coolant inlet manifold 146. Coolant (i.e., liquid or gas) entering the exhaust manifold 146 traverses the several heat exchangers 94, 96 and 98 via second channels 108 in the direction shown by the dotted line 148 which is (1) transverse the direction that the hydrogen-rich gas 150 flows, and (2) countercurrent to the general direction of flow of the hydrogen-rich gas through the reactor (i.e. from the inlet manifold 118 to the exhaust manifold 130).

Figure 6:
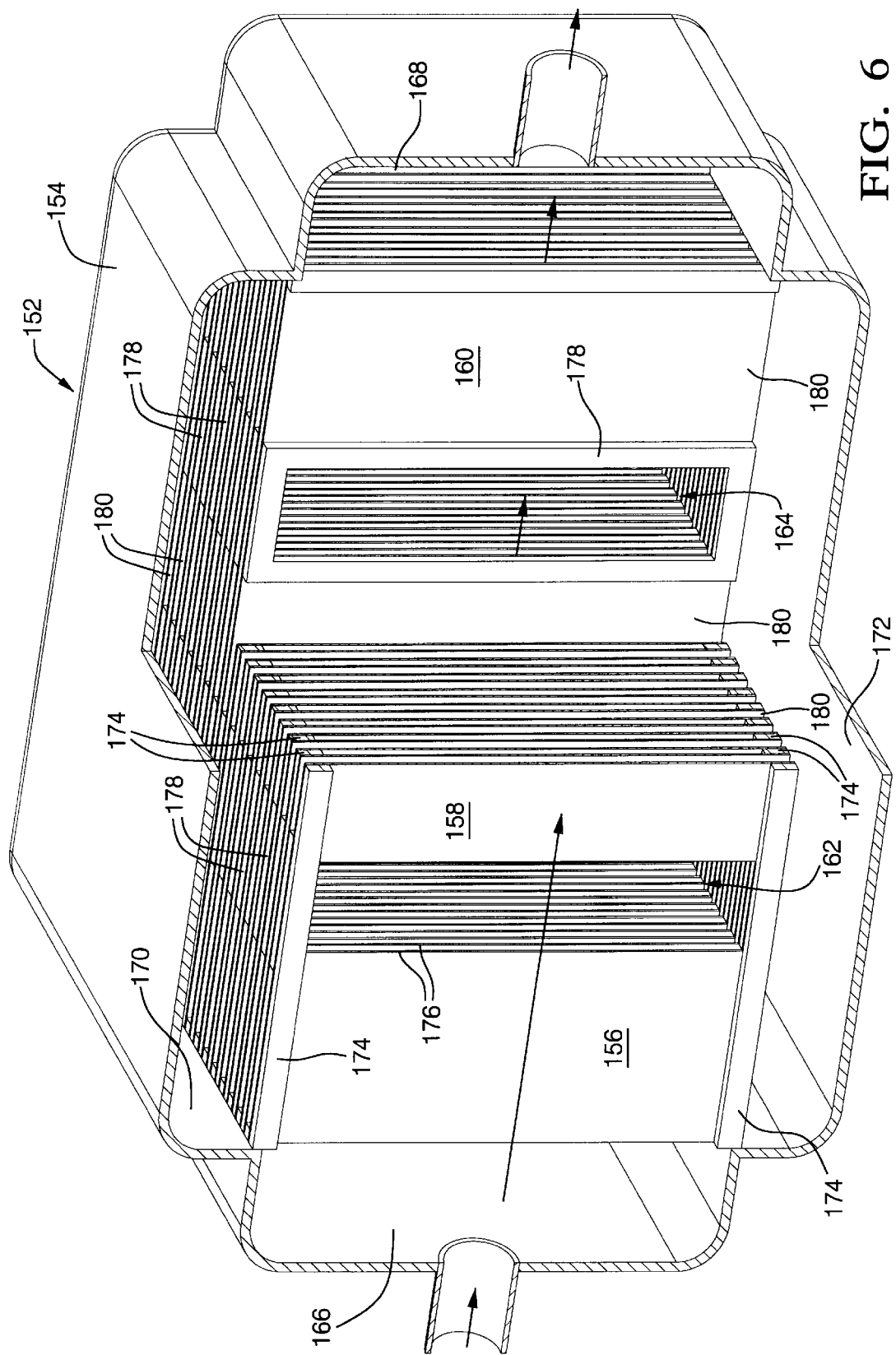
FIG. 6 is still another embodiment of a multi-stage isothermal reactor in accordance with the same invention.

FIG. 6 shows still another embodiment of the present invention wherein the several heat exchangers 156, 158 and 160 are serially arranged in end-to-end relation such that the exhaust end of one heat exchanger confronts the inlet end of the next adjacent heat exchanger across a mixing chamber. More specifically FIG. 6 shows a reactor 152 comprising a housing 154 enclosing three heat exchangers 156, 158 and 160. Each of the heat exchangers 156, 158, and 160 are separated from the next by mixing chambers 162 and 164. Hydrogen-rich gas enters the inlet manifold 166, traverses the several heat exchangers 156–160 and exits via exhaust manifold 168. Similarly, coolant enters a coolant inlet manifold 170, passes through the several heat exchangers 156–160 and exits via coolant exhaust manifold 172. In this embodiment spacer bars 174 interadjacent the ends of the thermally conductive barrier plates 176 space the barrier plates 176 from each other and serve to define the first gas flow channels of the heat exchangers 156, 158, and 160. A plurality of frame-like members 178 are positioned on the opposite faces of the thermally conductive barrier plates 176 and serve to define the second channels 180 through which the coolant flows. Air/oxygen may be injected into the mixing chambers 162 and 164 from injectors (not shown) positioned in the chambers 162 and 164.

When oxygen/air is added to the mixing chambers between the respective heat exchangers the relative amount of air/oxygen injected into the inlet manifolds as well as the mixing chamber(s) can be varied significantly. Hence for example the total amount of oxygen/air could be divided equally between the inlet manifold and the injection ports. On the other hand, the majority of the air/oxygen could be injected up front into the intake manifold, with less amounts into the mixing chamber(s). The effectiveness of at least some air injected into the mixing chambers has been demonstrated. In one test, all of the air required for the reaction was injected into the intake manifold of an iridium catalyzed multi-stage isothermal reactor according to the present invention and compared to a situation where only 85% of the air was injected into the intake manifold and 15% of the air injected into the first mixing chamber. A hydrogen -rich gas comprising 37.5% hydrogen, 37% nitrogen, 17% carbon-dioxide, 1% carbon-monoxide and 7.5% air (on a dry basis) was used as the feed gas. Table 1 shows the results of that test.

TABLE 1

|  | *HEX 1 | *HEX2 | *HEX3 |
|---|---|---|---|
| 100:0 | 0.69% | 0.30% | 65 ppm |
| 85:15 | 0.67% | 0.27% | 45 ppm |

*catalyzed heat exchanger

As the data in Table 1 indicates, the carbon-monoxide concentrations are significantly better in the situation where some of the air is added into a mixing chamber.

Figure 7:
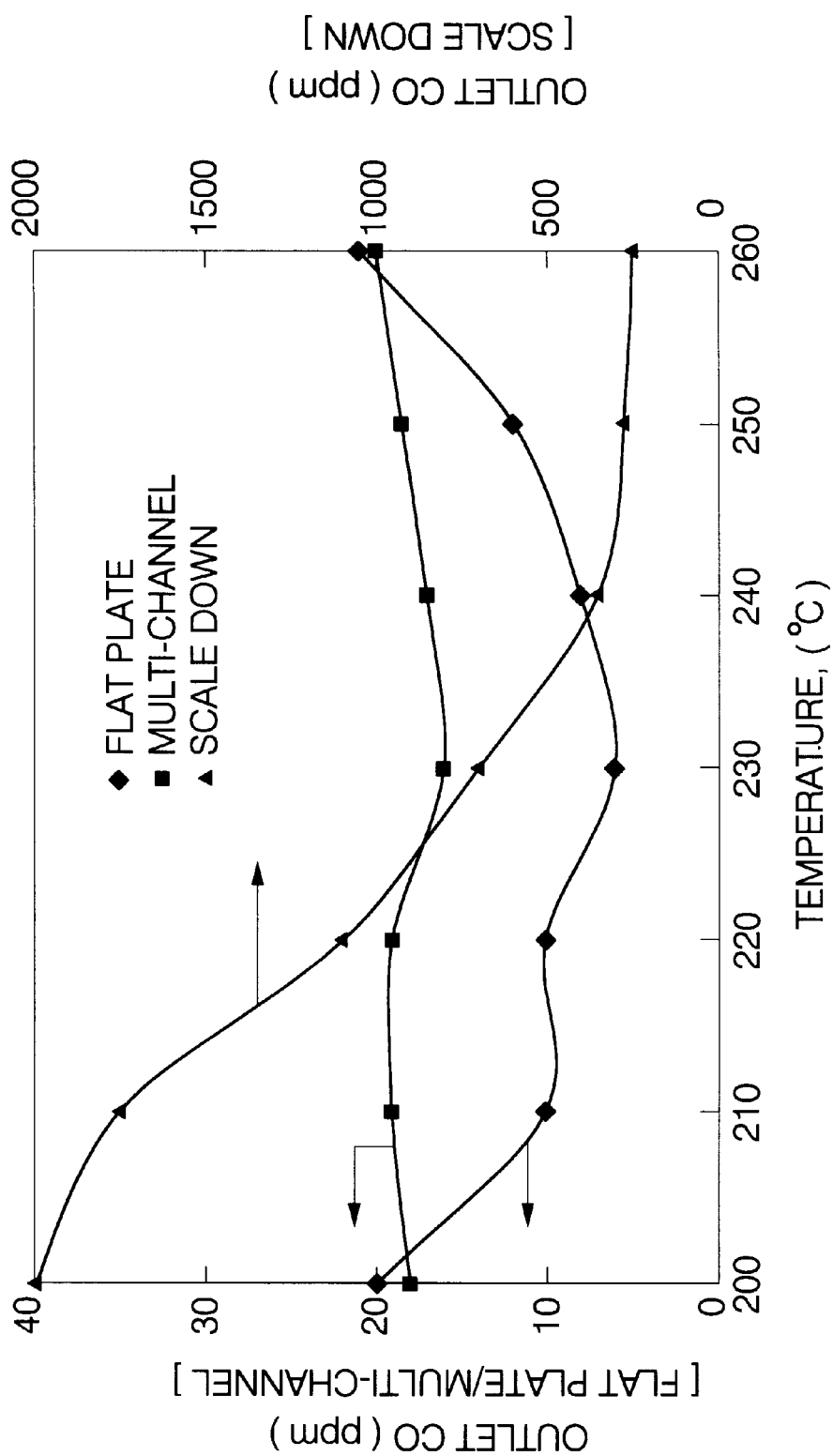
FIG. 7 is comparative data for certain tests.

Other tests demonstrated the benefits of a multi-staged reactor with intermediate mixing chambers between each catalyzed heat exchanger stage of the reactor. In this regard, improvement of carbon-monoxide reduction attributed to the mixing chambers can be illustrated by comparing the carbon monoxide outlet concentrations of a single channel reactor without inter-heat exchanger mixing to a multiple channel reactor with intermediate mixing chambers. For these tests, the single channel reactor comprised a single catalyzed flat plate spaced 0.025 inch from an uncatalyzed plate, and the multi-channel reactor comprised three heat exchangers each separated from the next by a mixing chamber and comprising three channels each defined by a pair of opposing Iridium-catalyzed plates spaced 0.050 inch apart. A feed stream containing approximately 42% hydrogen, 30% nitrogen, 16% carbon-dioxide, 0.65% carbon-monoxide, 11% air (on a dry basis) was utilized for the comparison. FIG. 7 shows the carbon-monoxide outlet concentration for the single channel reactor (diamonds) at the maximum flow rate that gave acceptable outlet carbon-monoxide results (less than 20 PPM CO). As the multiple channel PrOx reactor utilized had approximately 4.5 times the catalyzed surface area of the single channel reactor, it was expected to be able to perform at the same outlet CO concentrations at 4.5 times the total flow rate. However, during the testing it was found that the multi channel reactor could operate at up to 15 times the total flow rate of the single channel reactor at the same CO output levels. These results are shown in FIG. 7 as the multi-channel results (squares). Scale down (i.e. dividing the multiple channel flow rate by 4.5) of the multiple channel PrOx reactor flow rate to the single channel reactor flow rate was also tested. Dividing the multiple channel flow rate by 4.5 and trying that flow rate (i.e. 4 times the original flat plate total flow rate) in the single channel reactor yielded CO output concentrations shown in FIG. 7 (triangles). Operation at this flow rate indicates that the mixing chambers would significantly improve the PrOx reactor system performance under full fuel cell power operation.

While only mixing chambers comprising unoccupied spaces are described herein, it is to be understood that baffles, screens, impellers, or other turbulators may be included in the mixing chambers as mixing enhancers.

Multi-stage reactors in accordance with the present invention may be controlled by utilizing a carbon-monoxide sensor in the exhaust manifold to determine the carbon-monoxide concentration in the effluent and modulate the air flow to the reactor in response thereto. Alternatively, air flow to the reactor could be controlled by monitoring any temperature rise in the reactor incident to overheating resulting from an excessive occurrence of the reverse water/gas shift reaction.

While the invention has been disclosed primarily in terms of specific embodiments thereof it is not intended to be limited thereto but rather only to the extent set forth hereafter in the claims which follow.

What is claimed is:

1. A multistage isothermal reactor for the selective reaction between CO and $O_2$ in a $H_2$-rich gas flowing through said reactor to reduce the CO content of the gas to a suitable level which is not toxic to a fuel cell catalyst comprising:
a housing;
a plurality of catalyzed heat exchangers serially arranged within said housing in the direction of flow of said gas through said reactor for promoting said reaction in a series of progressive steps in which the CO content of the gas is incrementally reduced from one catalyzed heat exchanger to the next as the gas flows through said heat exchangers, said heat exchangers each comprising a plurality of thermally conductive barriers separating each heat exchanger into a plurality of first channels through which separate streams of said gas flow, and a plurality of second channels through which a coolant flows, said first channels having inlet ends for admitting said gas into said first channels and outlet ends for exhausting said gas from said first channels, said barriers each having (a) a catalyzed first surface confronting a said first channel, and (b) a second surface confronting a said second channel for contacting said coolant in said second channel to extract heat from said catalyzed first surface and maintain said heat exchanger at a substantially constant temperature suitable to promoting said reaction and discouraging the formation of CO from the reverse reaction of $CO_2$ with $H_2$, said first surface of one barrier and said first surface of the next adjacent barrier being spaced one from the other by at least one divider, said divider and said first surfaces together defining a said first channel for a first of said heat exchangers and a said first channel for a second of said heat exchangers that is contiguous said first heat exchanger, said first channels of said contiguous heat exchangers being substantially coplanar with each other;
a mixing chamber between the outlet ends of the first channels of the heat exchanger that is immediately upstream of the chamber and the inlet ends of the heat exchanger that is immediately down stream of the chamber to receive and substantially homogenize said streams exiting said upstream heat exchanger so as to distribute any unreacted $O_2$ and CO in said streams substantially uniformly throughout said gas before said gas enters said downstream heat exchanger, said chamber being configured to substantially reverse the direction of flow of said gas exiting said outlet ends and entering said inlet ends.

2. A reactor according to claim 1 including an injector communicating with said chamber to inject at least a portion of said $O_2$ into said chamber for mixing with said streams exiting from said upstream heat exchanger.

3. A reactor according to claim 1 wherein said second channels are constructed and arranged such that the flow of said coolant in said second channels is transverse the direction of flow of said streams in said first channels.

4. A reactor according to claim 1 wherein said chamber is defined by said housing.

5. A reactor according to claim 1 wherein the inlet ends of one heat exchanger are substantially coplanar with the outlet ends of the next adjacent heat exchanger at said chamber.

6. A reactor according to claim 1 including an inlet manifold communicating with the inlets ends of the first channels of the first heat exchanger in the series of serially arranged heat exchangers for supplying said gas to said first heat exchanger, and an exhaust manifold communicating with the outlet ends of the first channels of the last heat exchanger in the series of serially arranged exchangers to collect gases from said last heat exchanger.

7. A reactor according to claim 1 wherein a single said barrier separates a plurality of said coplanar first channels from a single said second channel.

8. A reactor according to claim 1 wherein said housing includes at least one endplate secured to the heat exchangers, said endplate having a face abutting the inlet ends of the first channels of one heat exchanger and the outlet ends of the first channels of an adjacent heat exchanger, said chamber being formed in said face.

9. A reactor according to claim 8 wherein said endplate includes a manifold for directing said gas to or from said first channels.

* * * * *